United States Patent [19]
Morishita et al.

[11] 4,188,642
[45] Feb. 12, 1980

[54] CCD IMAGER OPERABLE IN SINGLE FRAME AND REPETITIVE FRAME MODES

[75] Inventors: Masanobu Morishita; Hidehiko Inoue; Takao Ando; Mitsuru Kawasaki, all of Tokyo, Japan

[73] Assignee: Nippon Electric Co., Ltd., Tokyo, Japan

[21] Appl. No.: 792,012

[22] Filed: Apr. 28, 1977

Related U.S. Application Data

[63] Continuation of Ser. No. 597,990, Jul. 22, 1975, abandoned.

[30] Foreign Application Priority Data

Jun. 23, 1974 [JP] Japan .................................. 49-84490

[51] Int. Cl.² .............................................. H04N 3/14
[52] U.S. Cl. ...................................................... 358/213
[58] Field of Search ............... 358/213, 134, 133, 140, 358/137, 85, 217; 357/24, 30; 315/391, 395; 307/221 D; 250/211 J, 578

[56] References Cited

U.S. PATENT DOCUMENTS

| | | | |
|---|---|---|---|
| 2,965,709 | 12/1960 | Cherry et al. | 358/137 |
| 3,715,485 | 2/1973 | Weimer | 358/213 |
| 3,931,463 | 1/1976 | Levine | 358/213 |
| 3,931,465 | 1/1976 | Levine | 358/213 |
| 3,934,161 | 1/1976 | Caywood | 358/213 |

OTHER PUBLICATIONS

Amelio, "Charge-Coupled Devices," *Scientific American*, vol. 230, No. 2, Feb. 1974, pp. 23-31.

*Primary Examiner*—John C. Martin
*Attorney, Agent, or Firm*—Hopgood, Calimafde, Kalil, Blaustein & Lieberman

[57] ABSTRACT

A solid-state imaging apparatus includes a charge-coupled device having photoelectric converting means for accumulating charges corresponding to incident light rays and having a charge storage means for storing and transforming said accumulated charges during periods determined by a bias signal. Means are provided for controlling the period of the bias signal and read-out means are provided for obtaining the video signal from the charge-coupled device.

4 Claims, 6 Drawing Figures

CCD IMAGER OPERABLE IN SINGLE FRAME AND REPETITIVE FRAME MODES

This is a continuation of Ser. No. 597,990, filed July 22, 1975, now abandoned.

BACKGROUND OF THE INVENTION

The present invention relates to a solid-state imaging apparatus of the type including a charge-coupled device (CCD).

An imaging apparatus using electron beam scanning is known. In this type of apparatus, the period for which charges are accumulated in response to incident light for one picture element corresponds to one field or frame period. This is why it has been impossible to determine the charge storage time independent of field or frame period. Therefore, it is impossible to image a fast moving object without blotting. Further, in order to obtain a narrow-band video signal from a conventional imaging apparatus, a wide-band video signal of one frame produced by the imaging apparatus must be stored in a memory, and then the stored video signal is read out at a low speed.

It is, therefore, an object of the present invention to provide an imaging apparatus capable of imaging a fast moving object without blotting.

It is another object of the present invention to provide an imaging apparatus capable of producing a narrow-band video signal without employing an additional memory.

SUMMARY OF THE INVENTION

In the imaging apparatus including a charge-coupled device, scanning is like the operation of shift registers where the scanning time is essentially independent of the charge storage time.

In other words, in the imaging apparatus using a charge-coupled device charges generated proportionate to the value of incident light are accumulated in a potential well formed in the substrate underneath the electrode being biased. The period for which the potential well exists can be varied by changing the period for which the electrode is biased. Thus, by changing the period for which the electrode is baiased, the quantity of charges accumulated in the potential well in response to incident light can be controlled. The present invention utilizes this principle.

BRIEF DESCRIPTION OF THE DRAWINGS

Other features and advantages of the invention will be better understood from the following detailed description of a preferred embodiment of the invention taken in conjunction with the accompanying drawings, wherein.

DESCRIPTION OF THE PREFERRED EMBODIMENT

For the sake of explanatory simplicity, the principles of the invention will be described in connection with two-dimensional charge-coupled devices. It will be apparent, however, that the invention is readily applicable to one-dimensional charge-coupled devices.

Figure 1:
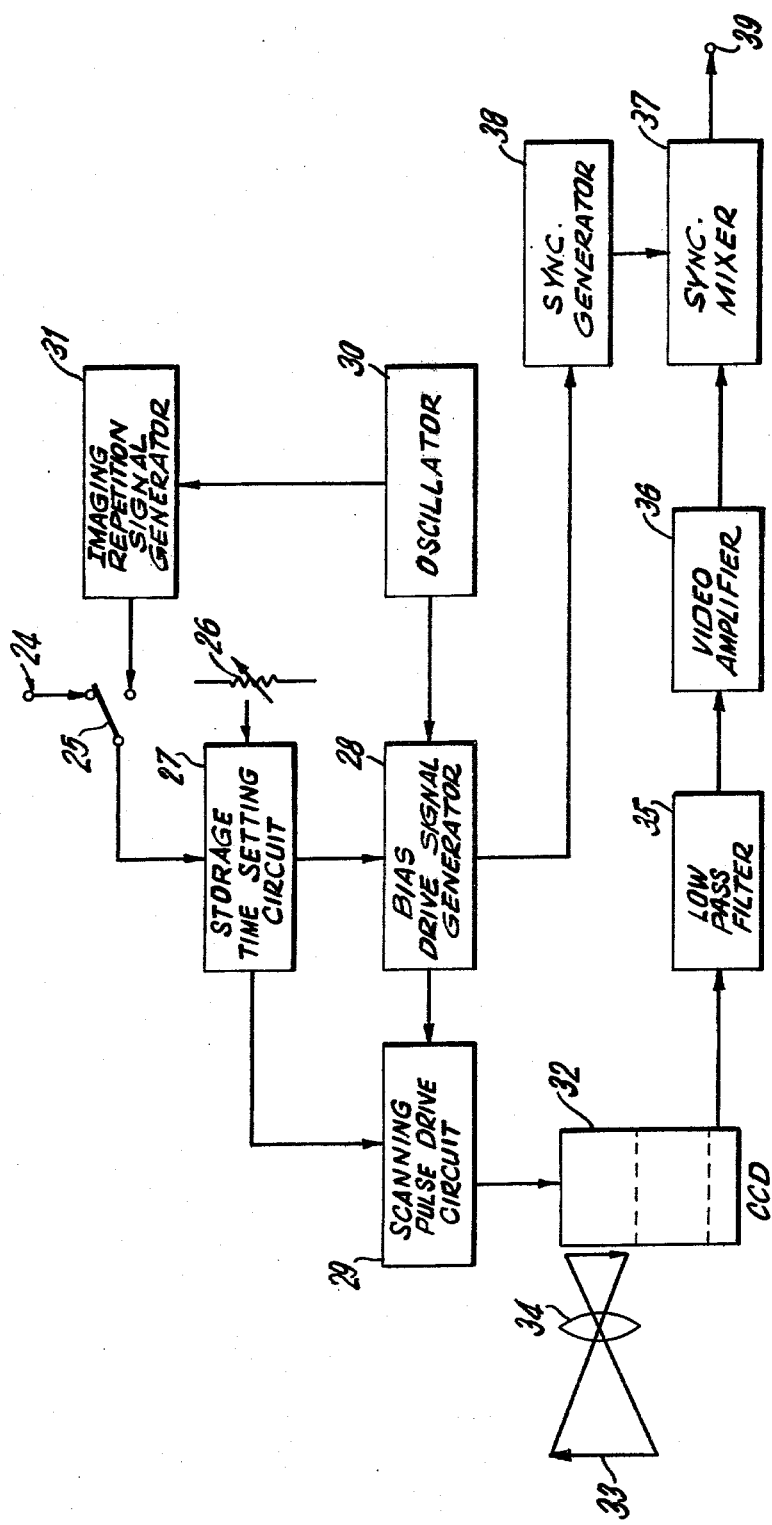
FIG. 1 is a block diagram of an embodiment of the present invention.
Figure 2:
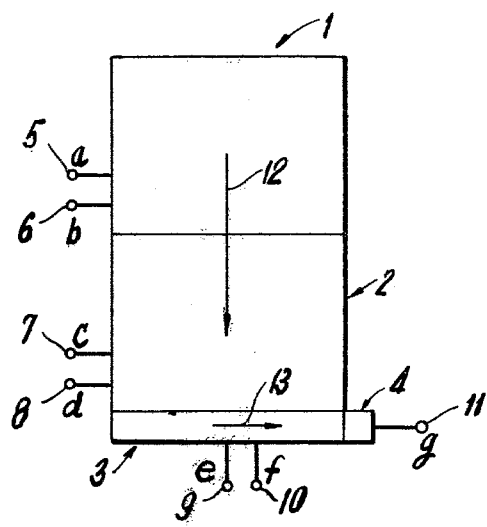
FIG. 2 is a schematic diagram of a charge-coupled device used in the embodiment shown in FIG. 1.

FIG. 1 shows an embodiment of the present invention in which an object 33 is focused through a lens 34 on the photoelectric converter of a charge-coupled device 32 having an element construction as shown in FIG. 2. The charge transfer in the charge-coupled device 32 as shown in FIG. 2 is a frame transfer system as clearly explained in an article titled in "A Charge-Coupled Area Image Sensor and Frame Store" by C. H. Sequin et al. on pp. 244–252, IEEE Transactions on Electron Devices, vol. ED-20, March, 1973. The charge-coupled device 32 comprises a photoelectric converter 1, a charge storage 2, a read-out register 3, a readout part 4, input terminals 5 and 6 to which external drive pulses are applied for transferring charges in the photoelectric converter, input terminals 7 and 8 to which external drive pulses are applied for transferring charges in the storage means 2, input terminals 9 and 10 to which external drive pulses are applied for transferring charges in the read-out register 3, and a video signal output terminal 11. The arrows 12 and 13 indicate the directions in which charges are transferred. Instead of this frame transfer type charge transfer device, other types may be used for the purpose of the invention as long as arrangements are made to enable the period of charge storage in the photoelectric converter to be arbitrarily determined.

The charges accumulated in response to the incident light are converted into a video signal by a scanning pulse drive circuit 29 and then passed through a low-pass filter 35 to remove synchronous noise. Then, through a video amplifier 36 and a synchronizing signal mixer 37, a composite video signal is obtained at an output terminal 39. The drive circuit 29 receives two drive signals, one from a storage time setting circuit 27, and the other from a bias drive signal generating circuit 28. The circuit 27 generates the drive signal which is initiated by a signal from a switch 25, and is continued for the desired period of charge storage time which is determined by a variable resistor 26. The circuit 28 is operated by a charge storage time end signal from the circuit 27 and by a signal from an oscillator 30, to transfer charges accumulated in the charge-coupled device 32. The output of the oscillator 30 is supplied to an imaging repetition signal generator 31, which in turn generates a trigger signal for determining the imaging synchronism for each field. Receiving this trigger signal, the switch 25 selects either the signal from the imaging repetition frequency generator 31 or the imaging start signal from the input terminal 24, thus causing the imaging circuit to perform either one imaging or a series of repetitive imagings. A synchronizing signal is generated from a synchronizing signal generator 38 by way of the bias drive signal generator 28 and mixed with the video signal by a synchronizing mixer 37.

Figure 3:
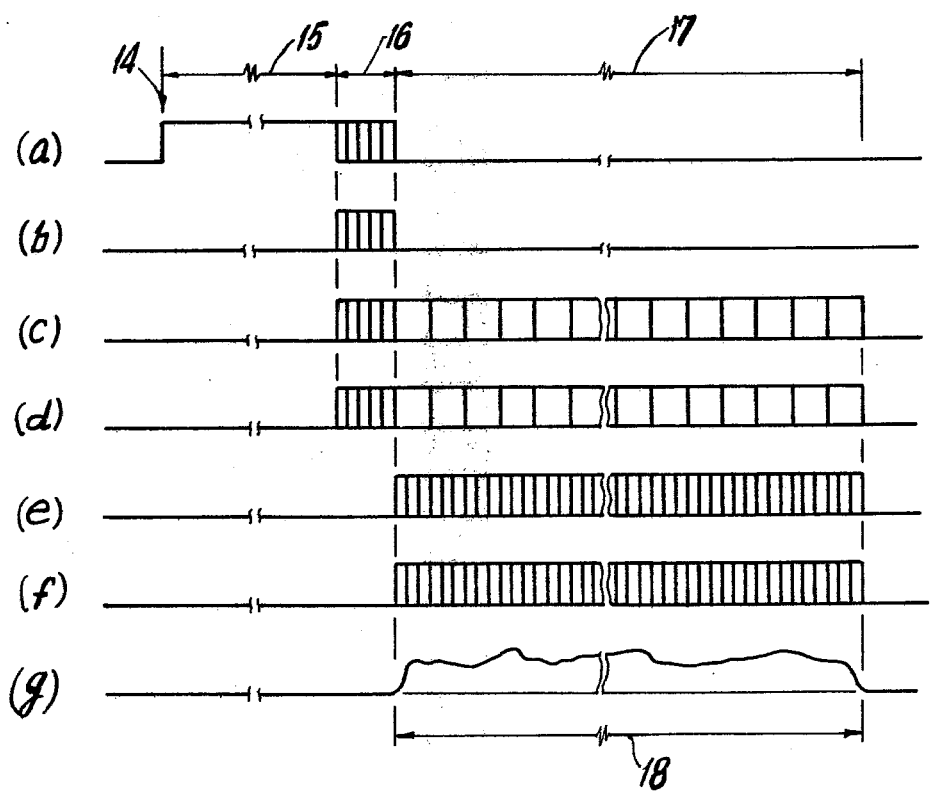
FIGS. 3 and 4 show waveforms of signals appearing in various parts of the embodiment of FIG. 1 operated as a narrow-band still picture imaging apparatus.
Figure 4:
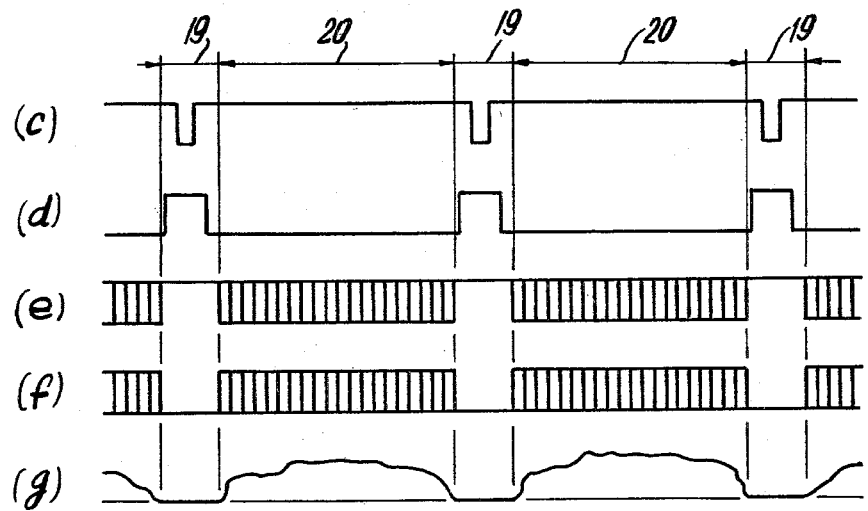

In this solid-state imaging device, when the scanning pulses shown in FIGS. 3 and 4 are applied to the charge-coupled device 32, one frame of the object is instantaneously imaged and a narrow-band video signal is produced therefrom whereby still picture imaging is realized for narrow-band transmission.

The operation of this imaging apparatus will be described in more detail by referring to FIGS. 1, 2, 3 and 4. When the switch 25 is placed to the upper position, an external trigger signal drives at the input terminal 24 at a time 14. Then a storage time 15 is set by the variable resistor 26 through the storage time setting circuit 27. The waveforms shown in FIGS. 3 and 4 are of the drive signals applied to the charge-coupled device 32, in such manner that the waveform (a) is applied to the input terminal 5, (b) to the input terminal 6, (c) to the input terminal 7, (d) to the input terminal 8, (e) to the input terminal 9, (f) to the input terminal 10, and (g) appears at the output terminal 11. For the period 15 the charges are accumulated in the photoelectric converter 1. Meanwhile for the period 16, the charges accumulated in the photoelectric converter 1 are transferred to the charge storage means 2, and for the period 17 all the charges in the charge storage 2 means are read out through a repetitive process so that groups of charges are transferred, line by line, from the charge storage means 2 to the read-out register 3, and the charges in the read-out register 3 are supplied as a video signal to the output terminal through the readout part 4 prior to the time at which a subsequent group of charges are transferred from the charge storage 2. In terms of television signal, the period 17 corresponds to one video field. The waveforms shown in FIG. 4 are taken on an extended time axis of the period 17.

The waveforms (c), (d), (e), (f) and (g) of FIG. 4 are the same as those shown in FIG. 3. In FIG. 4, the numeral 19 indicates the period for which charges are transferred from the charge storage 2 to the read register 3, and 20 is the period for which the charge in the read-out register 3 is supplied as a video signal output through the readout part 4. In terms of a television signal, the period 20 corresponds to one line video.

Assume that the charge transfer device 32 consists of 512 elements per row and 512 elements per column and that the storage time 15 is 1/60 sec, i.e., one field period in the standard television system, the frequency of the drive signal for the period 16 is 1 MHz, the period 19 is 10 $\mu$s, and the frequency of the drive signal for the period 20 is 1 MHz. Then, when drive signals, as in FIGS. 3 and 4, are applied to the charge-coupled device 32, the period 16 is 256 $\mu$s, the period 20 is 512 $\mu$s, and the period 17 is approximately 133.6 ms. Accordingly, one imaging operation period is approximately 151 ms, which is the sum of the periods 15, 16 and 17. In other words, a video signal produced by imaging at an exposure of 1/60 sec can be transmitted in approximately 151 ms. This signifies the fact that the bandwidth of the video signal is less than 500 KHz, and thus an instantaneously imaged picture signal can be transmitted over a narrow band. On the receiver side, the video signal is converted through a scan converter into a standard television signal for view as a still picture on the screen.

Figure 5:
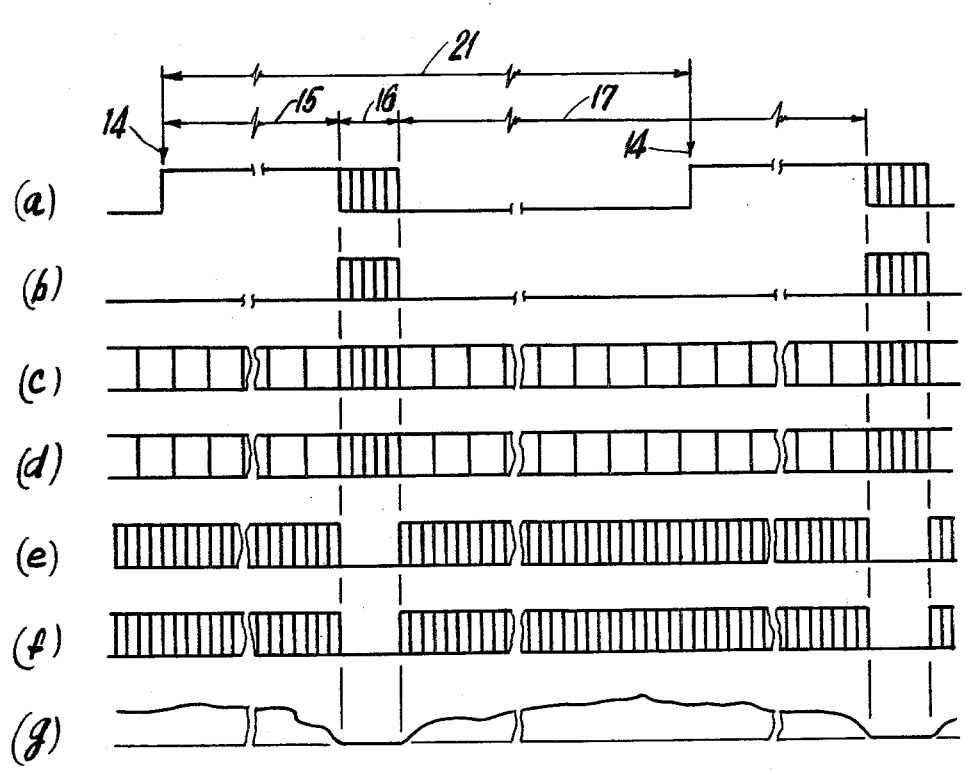
FIG. 5 shows waveform of signals appearing at various parts of the embodiment operated for imaging a fast moving object by frame.

FIG. 5 shows the timing of drive signals applied to the charge-coupled device 32 for operation where imaging is intermittently repeated by the imaging start signal from the imaging repetition frequency generator 31. For this operation, the switch 25 is placed in the lower position. In FIG. 5, the numeral 21 indicates the imaging repetition period, and (a) through (g) are the waveforms of the signals appearing at the same parts of the embodiment as in FIG. 3. Assume, for example, the period 21 is 1/60 sec, the period 16 corresponds to the vertical blanking period of a standard television signal, and the period 15 of charge storage in the photoelectric converter 1 is sufficiently small. Then a fast moving object can be picked up as an image with a minimum of blur. In other words, this imaging device can be used for the purpose of imaging by frame.

Figure 6:
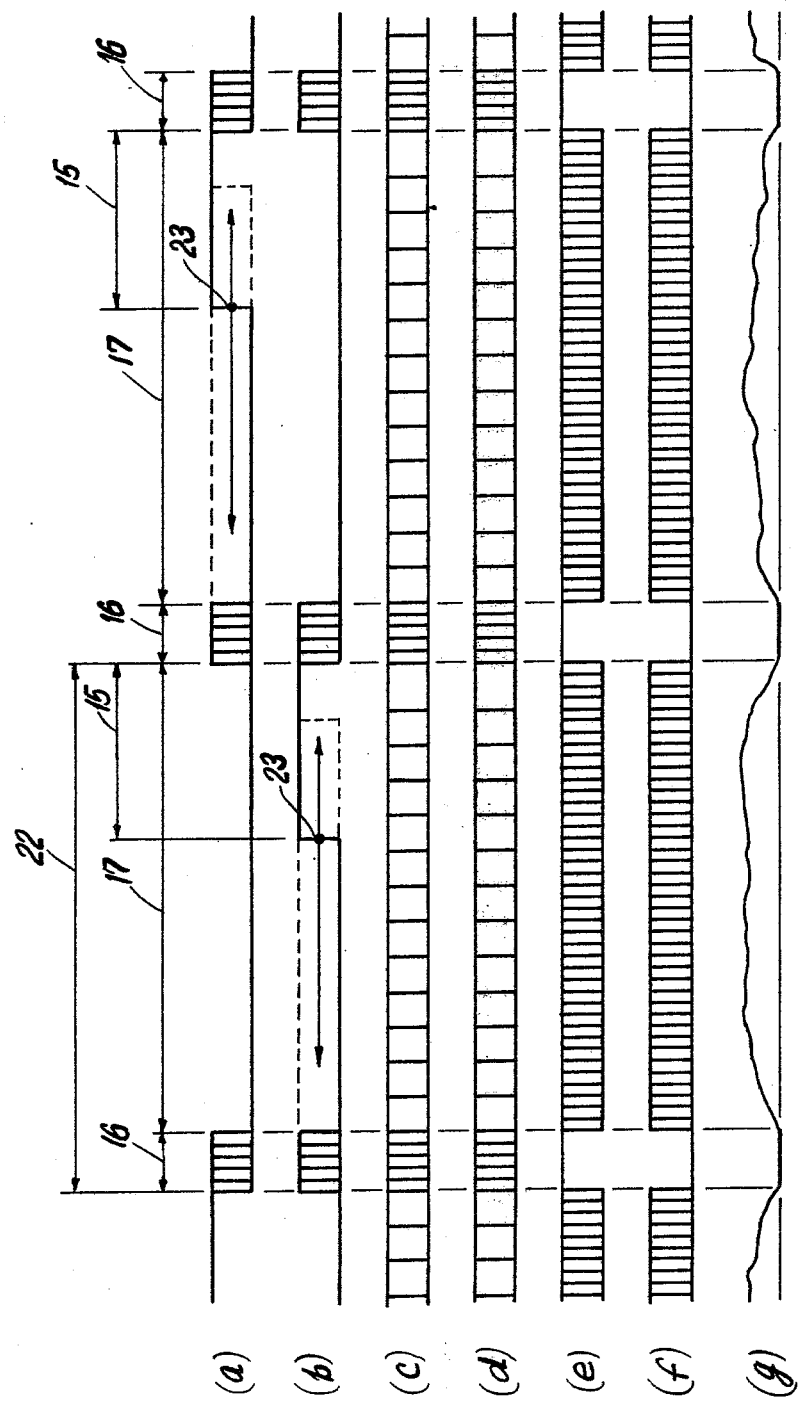
FIG. 6 shows waveforms of signals appearing at various parts of the embodiment for which the imaging sensitivity is controlled electronically.

The timings shown in FIGS. 3 and 5 are used for applications to the same electrode combination biased for accumulating charges in the photoelectric converter 1, i.e., in areas underneath a plurality of electrodes connected to the input terminal 5. While the timing shown in FIG. 6 is for operation by interlace drive where the combination of electrodes to be biased is switched each on field for charge storage in the photoelectric converter 1. In FIG. 6 the waveforms (a) through (g) occur at the same points as those (a) through (g) in FIGS. 3 and 5. The numeral 22 indicates one field period, and 23 the timing for determining the period of a charge storage in the photoelectric converter 1. This timing 23 can be shifted in the arrow directions by controlling the variable resistor 26. Thus, when the value of incident light is constant, the quantity of charges accumulated in the photoelectric converter 1 can be changed by changing the timing 23. This makes it possible to change the video signal level which is the output of the charge-coupled device 32. Therefore, by changing the timing 23, the apparent imaging sensitivity can be changed to enable the imaging apparatus of the invention to control its sensitivity electrically.

For a series of repeating imaging as in FIGS. 5 and 6, the output signal of the charge-coupled device, e.g., the level of the video signal which is the output of the video amplifier 36, is detected and converted into a DC voltage. This DC voltage may be used instead of the variable resistor 26 to control automatically the charge storage time of the setting circuit 27 whereby the level of the output video signal of the solid-state imaging apparatus of the invention can be kept constant. The output video signal level may be detected in terms of peak value, mean value, peak value of low frequency, band or other suitable value.

While one preferred embodiment of the invention and specific modifications thereof have been described in detail, it is to be understood that this description is for illustrative purposes only, and numerous variations may occur to those skilled in the art without departing from the true spirit of the present invention.

What is claimed is:

1. A solid-state imaging apparatus comprising means for accumulating charges corresponding to incident light rays during periods determined by a bias signal and having charge storage means for storing and transferring said accumulated charges in response to a first transfer drive signal, and readout register means for transferring said charges in response to a second transfer drive signal;

means coupled to said charge-coupled device for producing said bias signal and for applying said bias signal to said converting means of said charge-coupled device;

means coupled to said bias signal producing means for establishing a predetermined period of said bias signal to determine said period for which said charges are accumulated;

means for producing said first and second transfer drive signals to be applied to said charge storage means and said readout register means, respectively;

means for selecting between a single image mode and a repetitive image mode;

means responsive to said selecting means for changing the repetition frequencies of said first and second transfer drive signals; and read-out means for obtaining the video signal from said charge-coupled device.

2. The imaging apparatus of claim 1, wherein said means for establishing a predetermined period of said bias signal includes a variable resistor by which the period of said bias signal may be varied.

3. The imaging apparatus of claim 1, wherein said charge storage means is of the frame transfer type.

4. The imaging apparatus of claim 3, wherein said means for controlling the said bias signal includes an oscillator for generating a trigger signal that determines the field synchronization of the charge storage means.

* * * * *